(12) United States Patent
Gau

(10) Patent No.: US 6,882,192 B2
(45) Date of Patent: Apr. 19, 2005

(54) HIGH-SPEED DATA BUFFER

(75) Inventor: Shyh-Pyng Gau, TaiNan (TW)

(73) Assignee: Via Technologies Inc. (TW)

( * ) Notice: Subject to any disclaimer, the term of this patent is extended or adjusted under 35 U.S.C. 154(b) by 751 days.

(21) Appl. No.: 09/827,136

(22) Filed: Apr. 5, 2001

(65) Prior Publication Data

US 2001/0032322 A1 Oct. 18, 2001

(51) Int. Cl.⁷ .................................................. H03L 7/00
(52) U.S. Cl. ................................... 327/141; 327/144
(58) Field of Search ................................. 327/141, 202, 327/203, 208, 210, 212, 211, 218, 144

(56) References Cited

U.S. PATENT DOCUMENTS

| 4,157,587 A | 6/1979 | Joyce et al. ................. 711/137 |
| 4,823,259 A | 4/1989 | Aichelmann, Jr. et al. .. 711/122 |
| 5,043,921 A | 8/1991 | Gonzalez-Lopez et al. . 345/422 |
| 5,250,858 A | * 10/1993 | Strong ........................... 326/46 |
| 5,789,953 A | * 8/1998 | Au et al. ..................... 327/116 |
| 5,799,048 A | * 8/1998 | Farjad-Rad et al. ........ 375/360 |
| 6,137,337 A | * 10/2000 | Beom .......................... 327/296 |
| 6,269,414 B1 | * 7/2001 | Engdahl ...................... 710/300 |
| 6,535,045 B1 | * 3/2003 | Vangal ........................ 327/333 |
| 6,647,506 B1 | * 11/2003 | Yang et al. .................. 713/503 |

* cited by examiner

Primary Examiner—Tuan T. Lam

(57) ABSTRACT

Disclosed is a high-speed data buffer, wherein a buffer circuit composed of a ring counter is divided into two sampling circuits composed of a rising-edge portion and a falling-edge portion, and both of the two sampling circuits comprises a trigger circuit and a sampling clock generation circuit. In such a manner, the excess pulse edge can be ensured to occur before the correct edge so that the error data caused by the excess pulse can be over-written with the correct data input afterwards. Therefore, a clock cycle of timing margin can be obtained and the data stored in the data buffer can be ensured to be correct.

16 Claims, 13 Drawing Sheets

HIGH-SPEED DATA BUFFER

BACKGROUND OF THE INVENTION

1. Field of the Invention

The present invention generally relates to a high-speed data buffer, and more particularly, to a data buffer applicable to a single data rate buffer adopting either the rising edge or the falling edge of the clock signal and also a double data rate buffer adopting both the rising edge and the falling edge of the clock signal. Such a high-speed data buffer is suitable for use in high-speed data communication systems.

2. Description of the Prior Art

In recent years, as the demands for a higher speed of data processing and a higher frequency for operation in the computer system continuously increase, designers of high-speed circuits have often encountered problems due to insufficient processing timing margin. Therefore, it has become an important topic to well control the timing of the rising edge and the falling edge of the clock signal.

On the other hand, IEEE-1394 has become a standard for communication interface for future digital information products since Japan-based superpowers of electrical/electronic products have promoted the applications of IEEE-1394 in digital information products. Nowadays, IEEE-1394 has been widely adopted in the state-of-the-art digital cameras such as DV and D8 in Japan, the United States and Europe, and therefore the research and development of the related communication products has drawn a great amount of interests.

Accordingly, the applications of high-speed transfer data in combination with the IEEE-1394 Series Bus have attracted the industry's investment. For an exemplary embodiment of the prior art, when the receiving end of the physical layer of the IEEE-1394 Series Bus is to be operated at 400 Mbit/sec, the data with a 200 MHz clock is decoded and then delivered (due to the double data rate). When the receiving end receives the data and the clock signal, in the worst case, a clock cycle can be as short as 3 ns (nanosecond) and a clock pulse can be as short as only 0.6 ns because of jitter and skew generated during the process in which the data and the clock signal pass through the cable or other circuit elements. For 0.35 μm process, the clock-to-output of a flip-flop takes about 0.6 ns to 1 ns. Therefore, the receiving end meets a serious problem in that insufficient timing leads to an error when the data are input into the data buffer. The explanation is described hereinafter.

Please refer to FIG. 1, which shows a circuit diagram illustrating a conventional data buffer in the prior art, exemplified by a 2×2 double data rate buffer, wherein the buffer circuit is structured to form a falling-edge-triggered ring counter. Such a data buffer comprises a first D-type flip-flop 2 with the negative output coupled back to the D input, forming a clock output circuit; and a second D-type flip-flop 4 and a third D-type flip-flop 6, forming a falling-edge-triggered ring counter, wherein the first flag signal FLAG1 represents the output of the second D-type flip-flop 4 and the second flag signal FLAG2 represents the output of the third D-type flip-flop 6. The positive output of the third D-type flip-flop 6 is coupled back to the D input of the second D-type flip-flop 4 so as to form a ring counter.

FIG. 2 shows two sampling circuits. In particular, FIG. 2A illustrates a first rising-edge sampling circuit operative for generation of a first sampling clock signal CLK1, wherein said first sampling clock signal CLK1 is generated by an AND operation of the clock signal and the first flag signal FLAG1 provided by a first AND gate 12; while, similarly, FIG. 2B illustrates a second rising-edge sampling circuit operative for generation of a second sampling clock signal CLK2, wherein said second sampling clock signal CLK2 is generated by an AND operation of the clock signal and the second flag signal FLAG2 provided by a second AND gate 14. On the other hand, the circuit structure shown in FIG. 3A and FIG. 3B is almost identical to that shown in FIG. 2A and FIG. 2B. The only difference is that the sampling circuits in FIG. 3A and FIG. 3B are falling-edge-triggered, and the related circuit elements and configurations are the same. In addition, it is further found that, in FIG. 2 and FIG. 3, the same circuit structure is adopted for both rising-edge sampling circuits and falling-edge sampling circuits, and such a circuit structure is different from our inventive circuit structure.

Please refer to FIG. 4, which is a general timing diagram of the conventional circuit shown in FIG. 2 and FIG. 3, wherein the first sampling clock signal CLK1 is proved to be obtained by an AND operation of the clock signal and the first flag signal FLAG1, and similarly the second sampling clock signal CLK2 is proved to be obtained by an AND operation of the clock signal and the second flag signal FLAG2. In FIG. 4, the data transfer is performed in a low-level region (labeled as "a") of the timing of the clock signal, and the low-level region is limited to be within only half a clock cycle. Therefore, the first sampling clock signal CLK1 and the second sampling clock signal CLK2 remain unaffected because the transitions of the first flag signal FLAG1 and the second flag signal FLAG2 are performed in a low-level region.

FIG. 5 shows a timing diagram relative to that shown in FIG. 4. In the drawing, the error in high-speed operations of a general buffer circuit as shown in FIG. 2 and FIG. 3 has been illustrated, wherein the time interval between clock II and clock III is 0.6 ns. When the transitions of the first flag signal FLAG1 and the second flag signal FLAG2 occur during clock III, the excess pulse (labeled as "b") may cause a certain amount of error data input into the buffer such that the incomplete pulse (labeled as "c") may lead to an error of sampling data. In such a manner, the mentioned insufficient timing problem in that the error data are stored in the buffer occurs and may become more serious in high-speed data transfer operations. Moreover, in the prior art, the transitions of the flag signals can only be performed in a half-a-clock-cycle low-level region of the timing of the clock signal; otherwise, the excess pulse signal may cause an error storage of the data. Needless to say, there is a need for solving the problem.

SUMMARY OF THE INVENTION

In order to overcome the above problem, it is the primary object of the present invention to provide a high-speed data buffer, wherein a buffer circuit is divided into two sampling circuits composed of a rising-edge device and a falling-edge device by using double data rate sampling technique adopting both the rising edge and the falling edge of the clock signal. In such manner, the data buffer of the present invention can be applicable to a single data rate buffer adopting either the rising edge or the falling edge of the clock signal and also a double data rate buffer adopting both the rising edge and the falling edge of the clock signal. Moreover, the timing margin of the flag signal can be prolonged from half a clock cycle to a full clock cycle so as to meet the requirement for high-speed applications.

To accomplish the foregoing object, the present invention provides a high-speed data buffer that comprises AND gates operative for generation of rising-edge sampling clock signals and OR gates operative for generation of falling-edge sampling clock signals to form a sampling circuit. In such a manner, the excess pulse edge can be ensured to occur before the correct edge so that the error data caused by the excess pulse can be over-written with the correct data input afterwards. Therefore, a clock cycle of timing margin can be obtained and the data stored in the data buffer can be ensured to be correct.

It is preferable that the embodiment of the present invention discloses mainly the data buffer adopting the rising edge and the falling edge. For the data buffer adopting either the rising edge or the falling edge, however, only the circuit adopting the rising edge or the circuit adopting the falling edge is necessarily used.

It is preferable that the high-speed data buffer can be applicable to not only high-speed data communication systems but also all kinds of high-speed system in which data buffers are necessary.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention provides a high-speed data buffer, wherein a buffer circuit comprising a ring counter is divided into two sampling circuits comprising a rising-edge portion and a falling-edge portion, and AND gates and OR gates are used for generation of sampling clock signals. In such a manner, the excess pulse edge can be ensured to occur before the correct edge so that the error data caused by the excess pulse can be over-written with the correct data input afterwards. Therefore, a clock cycle of timing margin can be obtained and-the data stored in the data buffer can be ensured to be correct.

Figure 1:
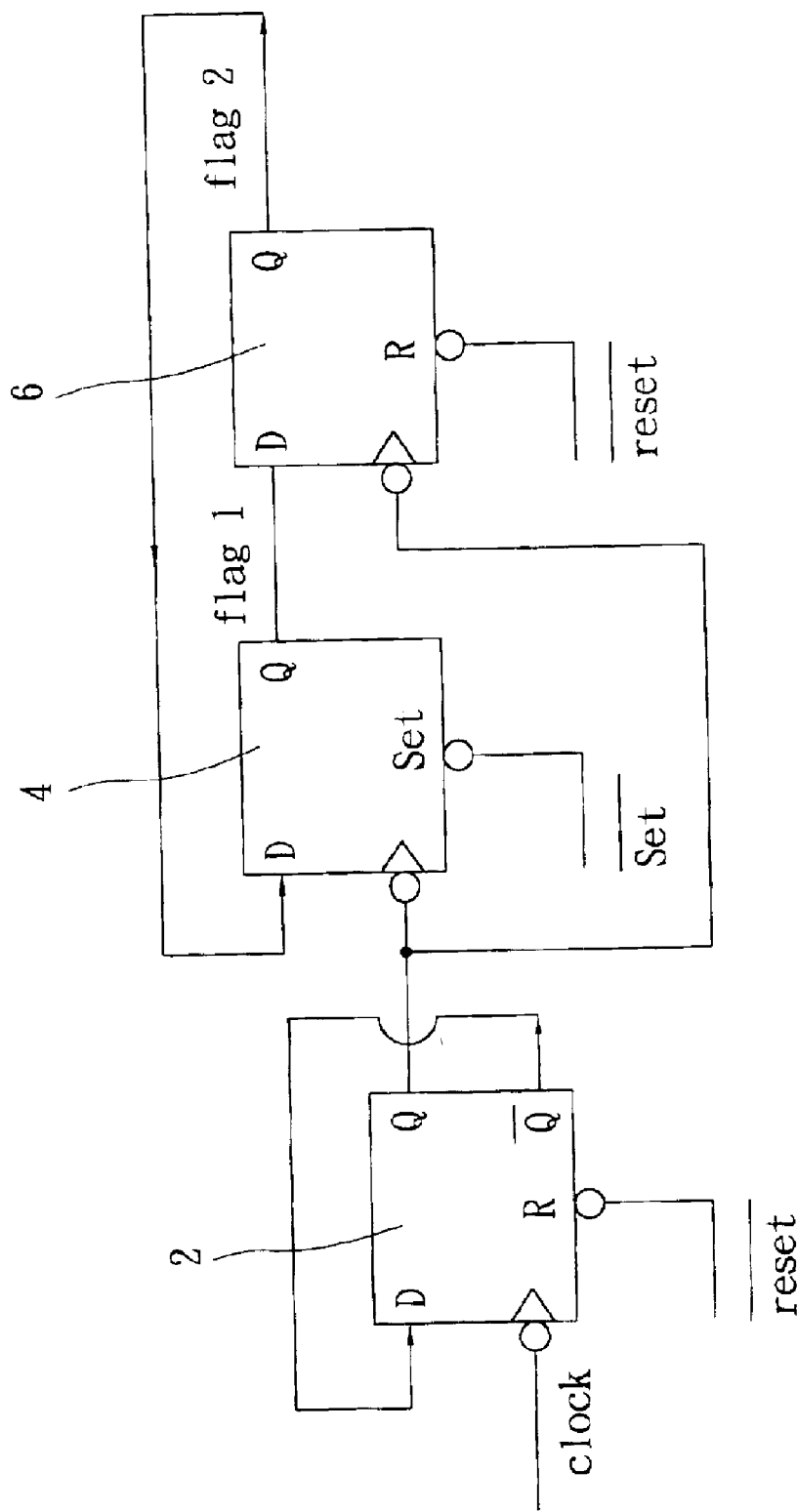
FIG. 1 shows a circuit diagram illustrating a conventional data buffer in the prior art, exemplified by a 2×2 double data rate buffer, wherein the buffer circuit is structured to form a falling-edge-triggered ring counter.
Figure 2A:
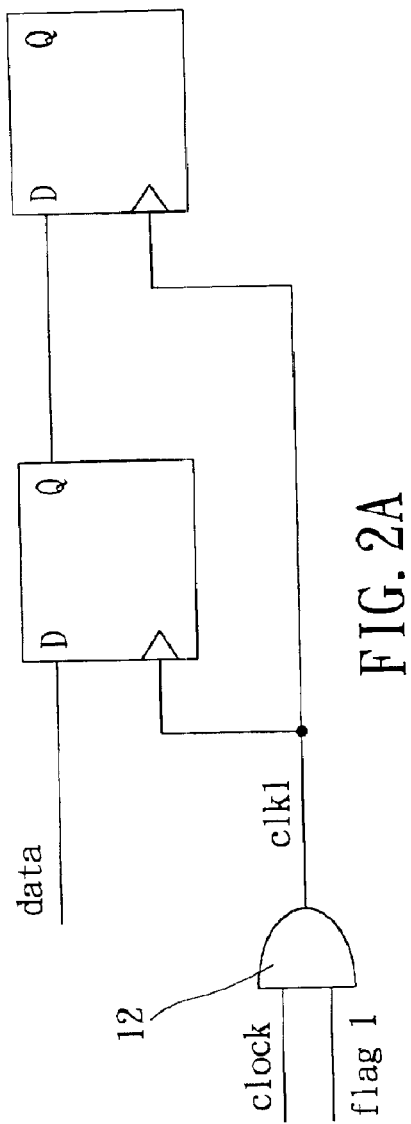
FIG. 2A illustrates a first rising-edge sampling circuit operative for generation of a first sampling clock signal in the prior art.
Figure 2B:
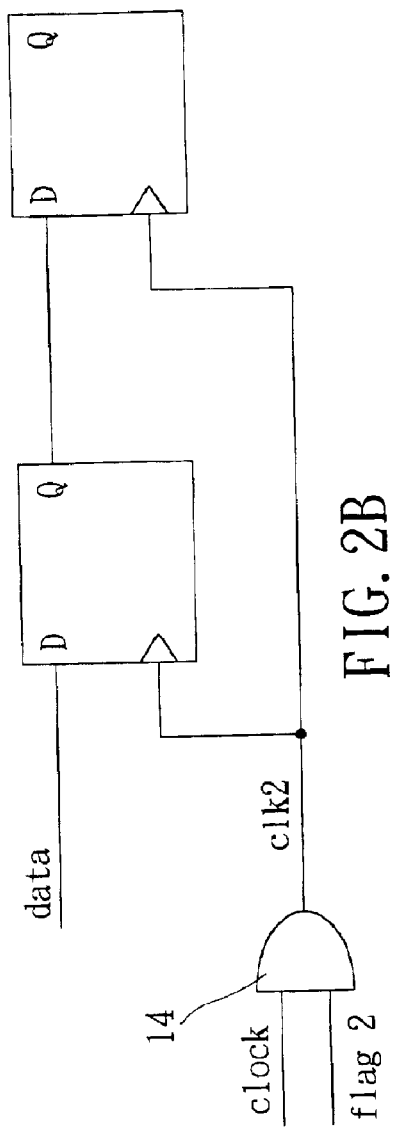
FIG. 2B illustrates a second rising-edge sampling circuit operative for generation of a second sampling clock signal in the prior art.
Figure 3A:
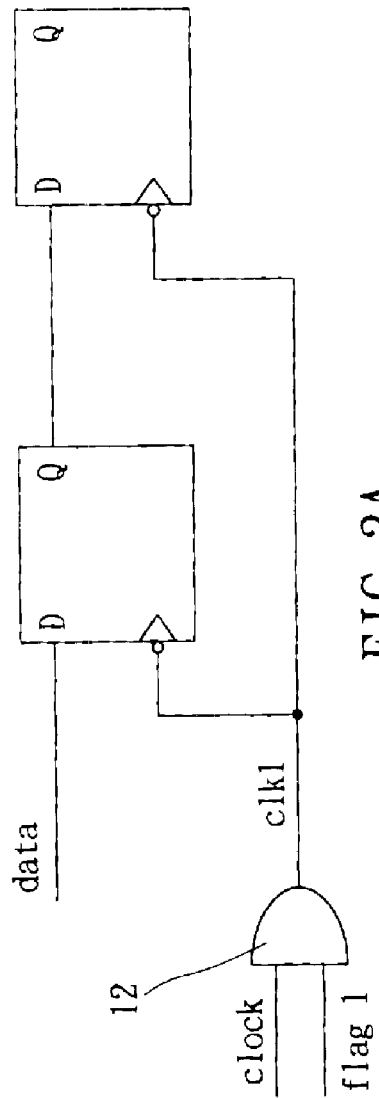
FIG. 3A illustrates a first falling-edge sampling circuit operative for generation of a first sampling clock signal in the prior art.
Figure 3B:
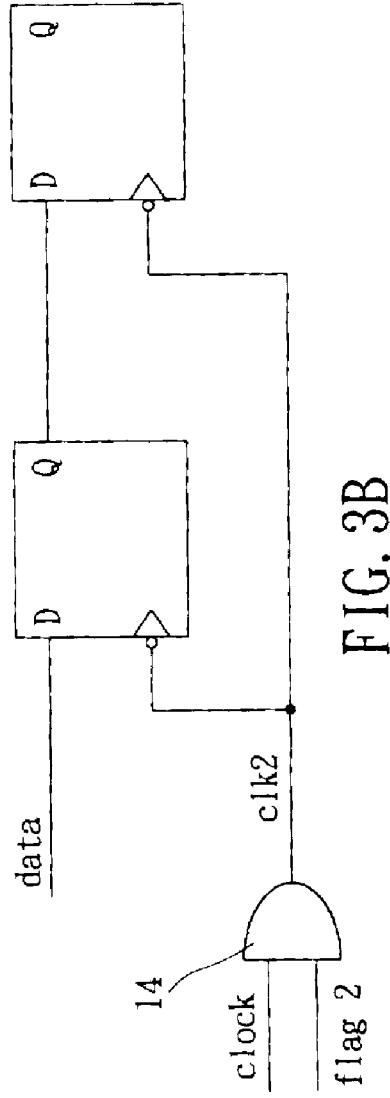
FIG. 3B illustrates a second falling-edge sampling circuit operative for generation of a second sampling clock signal in the prior art.
Figure 4:
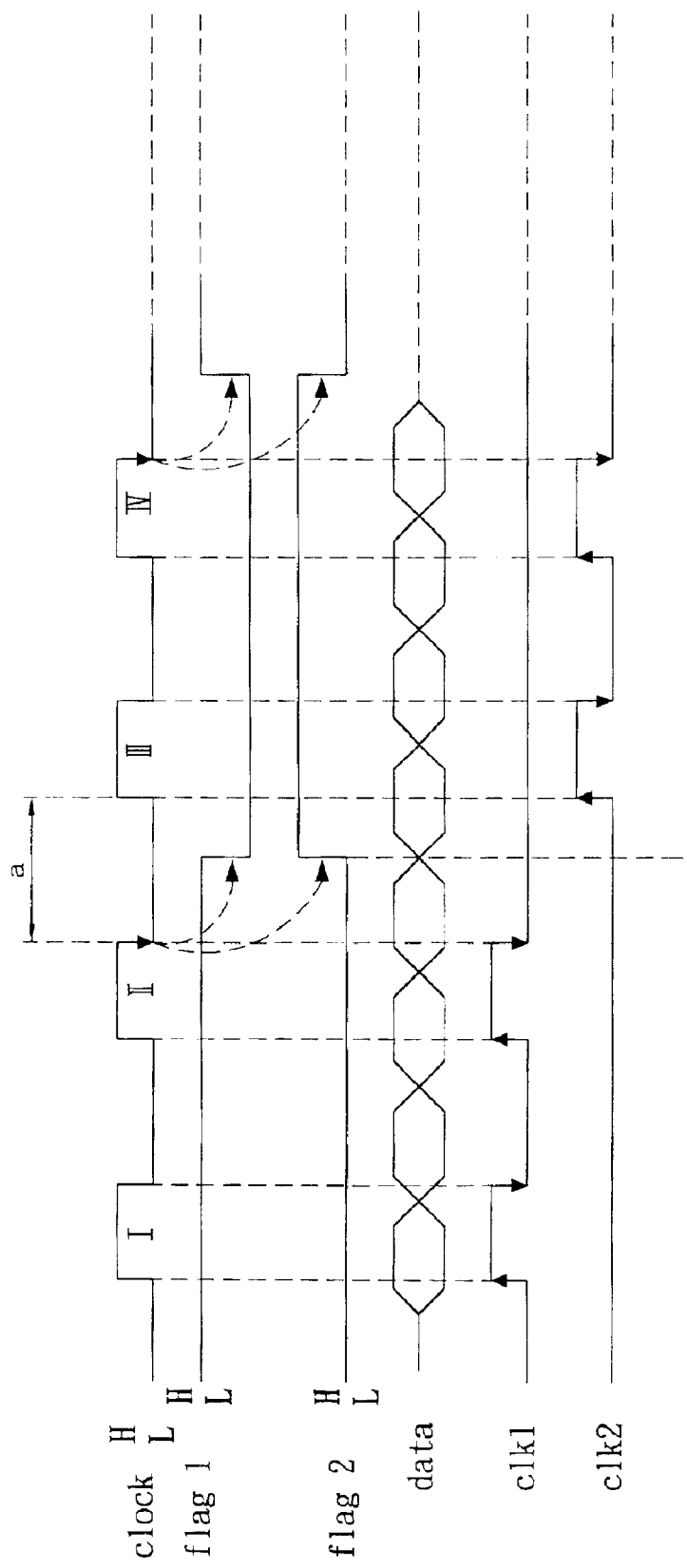
FIG. 4 shows a general timing diagram of the conventional data buffer in the prior art.
Figure 5:
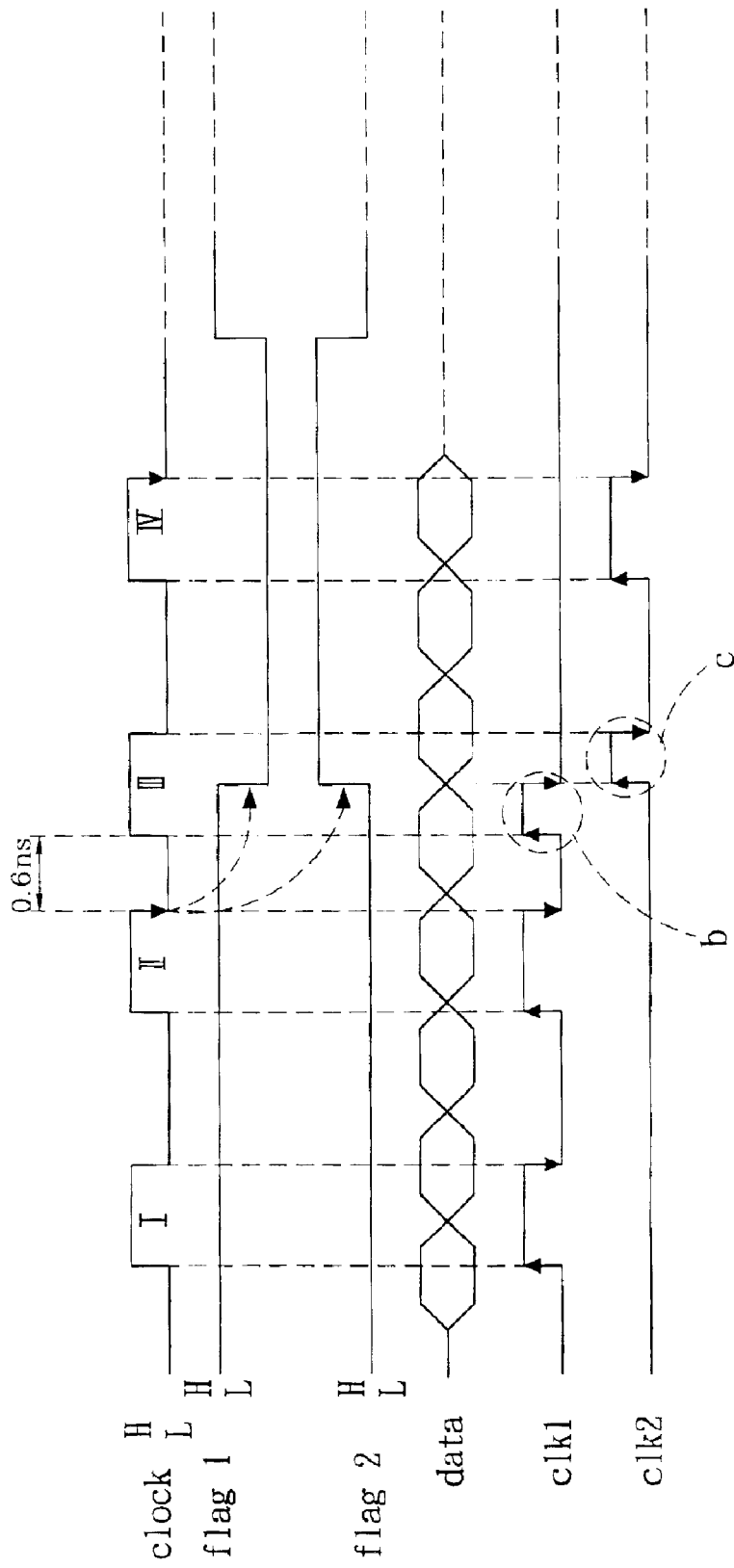
FIG. 5 shows a timing diagram illustrating an error in high-speed operations of the conventional data buffer in the prior art.
Figure 6:
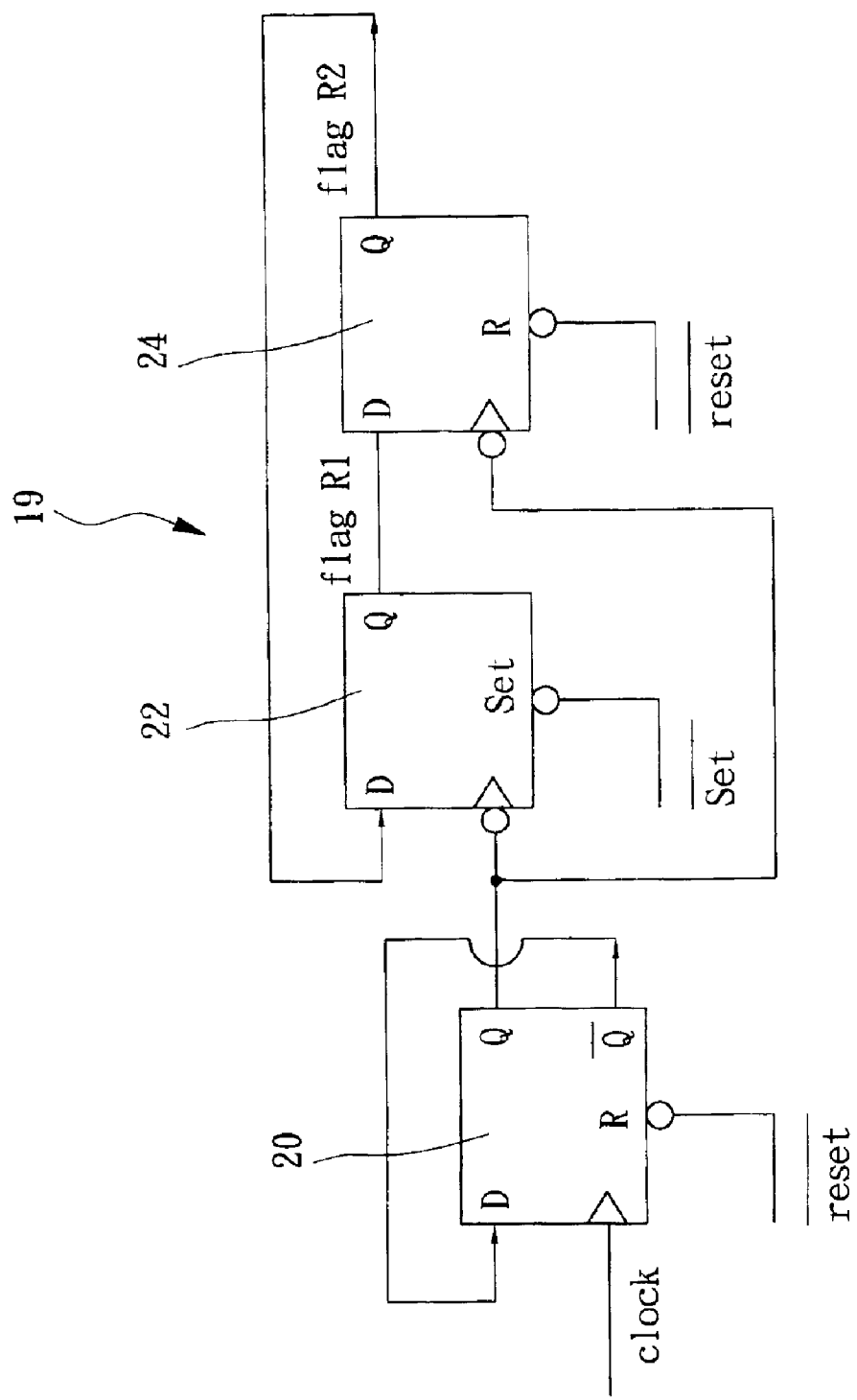
FIG. 6 shows a circuit diagram illustrating a trigger circuit (ring counter) of the rising-edge portion in accordance with one embodiment of the present invention.

For a further explanation of the present invention, to begin with, the rising-edge device comprises a trigger circuit and a plurality of rising-edge circuits so as to store the data. For the trigger circuit, please refer to FIG. 6, which is a circuit diagram illustrating a trigger circuit 19 (ring counter) of the rising-edge portion in accordance with one embodiment of the present invention. As shown in the drawing, said trigger circuit 19 composed of a ring counter receives a clock signal which is to be counted and then generate a first rising flag signal FLAG R1 and a second rising flag signal FLAG R2. The preferred embodiment of the present invention as shown in FIG. 6 is exemplified by a 2×2 configuration, which comprises a second D-type flip-flop 22 and a third D-type flip-flop 24 serially connected, forming a ring counter with the output of said third D-type flip-flop 24 coupled back to the D input of said second D-type flip-flop 22; and a first D-type flip-flop 20 connected to the input of said ring counter (i.e. said second D-type flip-flop 22) so as to provide said trigger circuit (ring counter) with required clock signals.

Figure 7A:
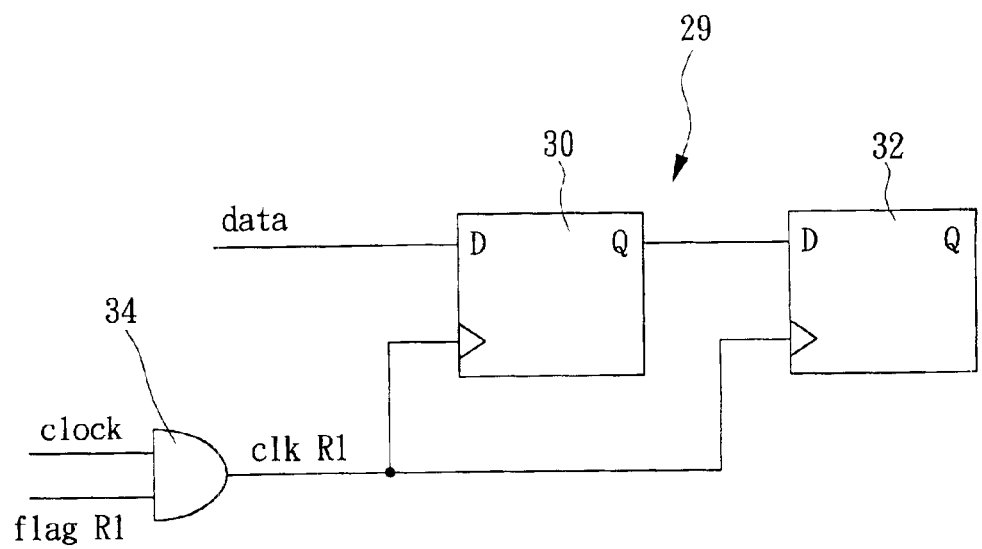
FIG. 7A illustrates a first rising-edge sampling circuit operative for generation of a first rising sampling clock signal in accordance with one embodiment of the present invention.
Figure 7B:
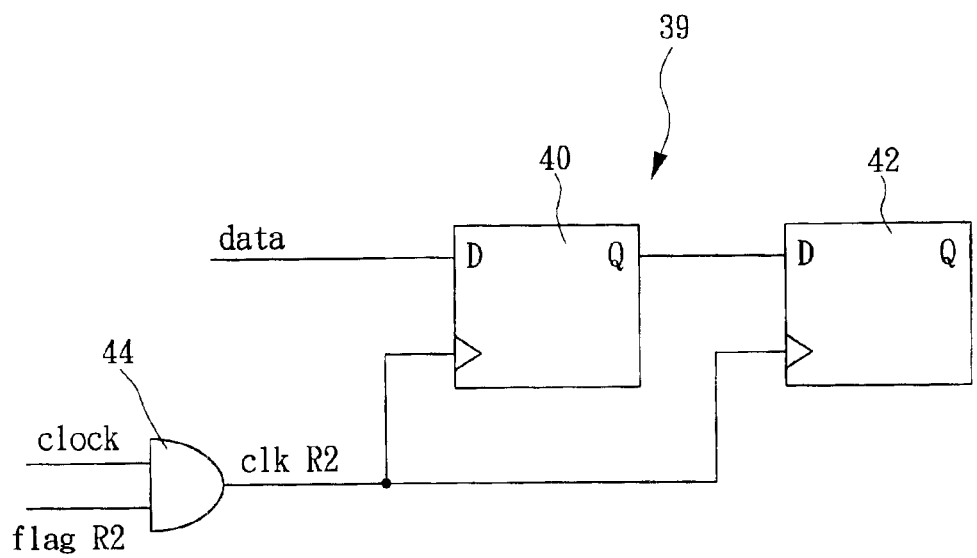
FIG. 7B illustrates a second rising-edge sampling circuit operative for generation of a second rising sampling clock signal in accordance with one embodiment of the present invention.

For the foregoing rising-edge sampling circuits 29 and 39, please refer to FIG. 7A and FIG. 7B. In particular, FIG. 7A illustrates a first rising-edge sampling circuit operative for generation of a first rising sampling clock signal CLK R1 in accordance with one embodiment of the present invention. Said rising-edge sampling circuit 29 comprises two serially connected D-type flip-flops. The preferred embodiment of the present invention as shown in FIG. 7A is exemplified by a 2×2 configuration, which comprises a first D-type sampling flip-flop 30 and a second D-type sampling flip-flop 32 serially connected so as to store the sampled data. The number of D-type sampling flip-flops can be increased according to the user's need. Said first rising sampling clock signal CLK R1 generated by an AND operation of said clock signal and said first rising flag signal FLAG R1 provided by a first AND gate 34 is input into said serially connected D-type flip-flops for timing control during data sampling.

On the other hand, FIG. 7B illustrates a second rising-edge sampling circuit operative for generation of a second rising sampling clock signal CLK R2 in accordance with one embodiment of the present invention. Said rising-edge sampling circuit 39 is composed of two serially connected D-type flip-flops. The preferred embodiment of the present invention as shown in FIG. 7B is exemplified by a 2×2 configuration, which comprises a third D-type sampling flip-flop 40 and a fourth D-type sampling flip-flop 42 serially connected so as to store the sampled data. The number of D-type sampling flip-flops can be increased according to the user's need. Said second rising sampling clock signal CLK R2 generated by an AND operation of said clock signal and said second rising flag signal FLAG R2 provided by a second AND gate 44 is input into said serially connected D-type flip-flops for timing control during data sampling.

Figure 8:
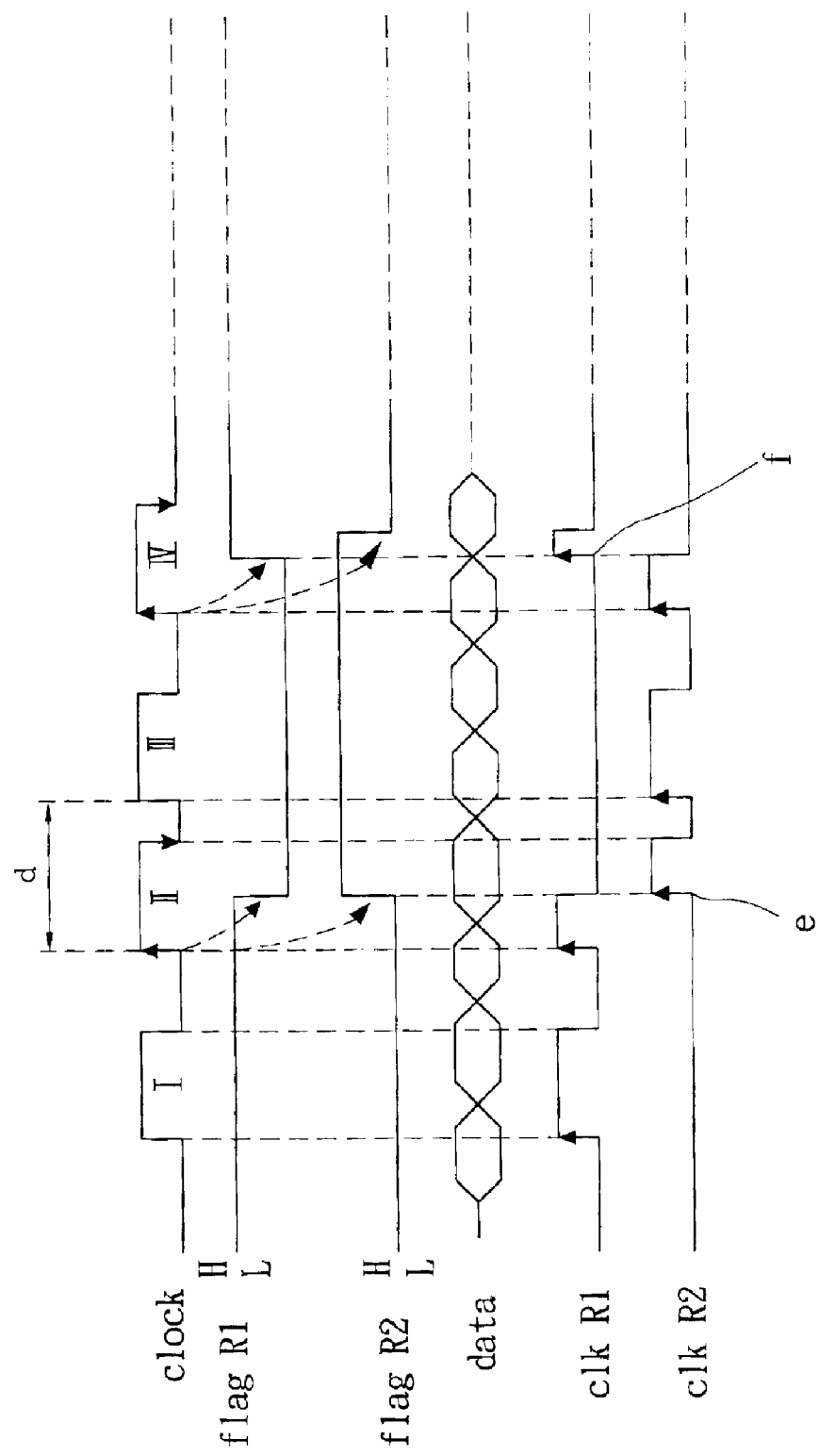
FIG. 8 shows a timing diagram of the rising-edge portion in accordance with one embodiment of the present invention, wherein the transitions of the flag signals are performed in a high-level region.
Figure 9:
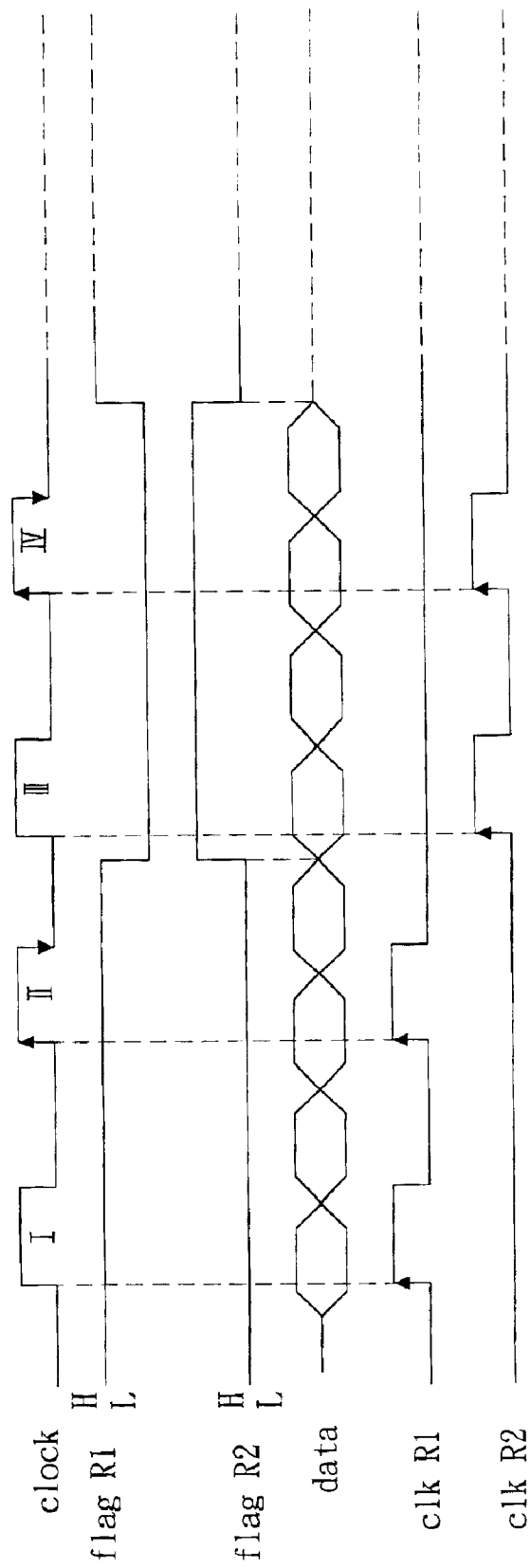
FIG. 9 shows a timing diagram of the rising-edge portion in accordance with one embodiment of the present invention, wherein the transitions of the flag signals are performed in a low-level region.

Please refer to FIG. 8, which shows a timing diagram of the rising-edge portion in accordance with one embodiment of the present invention, wherein the transitions of the flag signals are performed in a high-level region. In FIG. 8, the excess pulse edge (labeled as "e") occurs when the data transfer is performed in a high-level region and when the sampling is performed in the rising transition. For example, when the transitions of said first rising flag signal FLAG R1 and said second rising flag signal FLAG R2 are performed in the region "d" where clock II is high, the sampled data in the rising transition may be an error, but can be over-written with the correct data f sampled afterwards. On the other hand, FIG. 9 shows a timing diagram of the rising-edge portion in accordance with one embodiment of the present invention, wherein the transitions of the flag signals are performed in a low-level region. This case occurs in a normal condition in which the transitions of said first rising flag signal FLAG R1 and said second rising flag signal FLAG R2 are performed in the region "d" where clock II is low, therefore the sampled data are correct.

Figure 10:
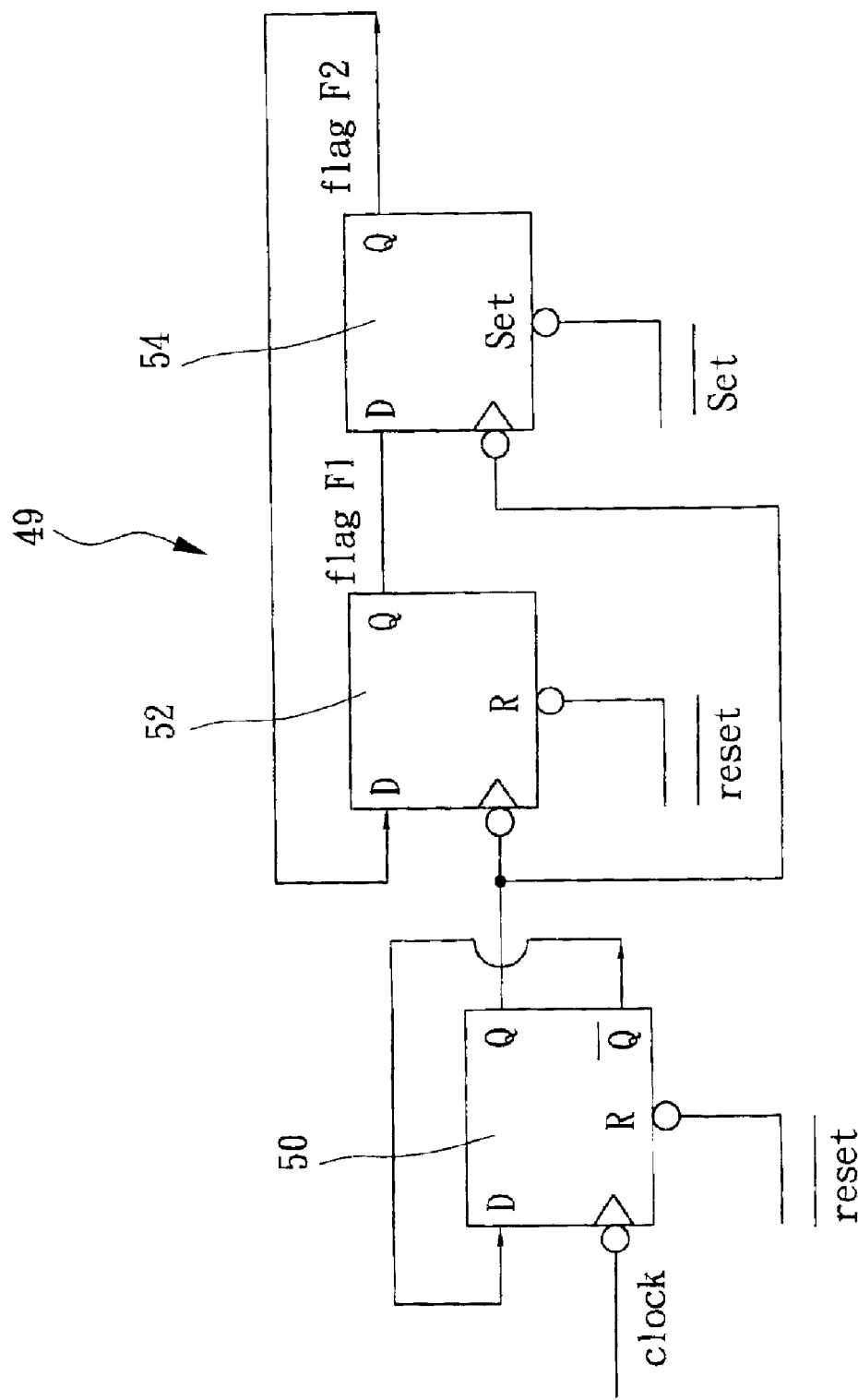
FIG. 10 shows a circuit diagram illustrating a trigger circuit (ring counter) of the falling-edge portion in accordance with one embodiment of the present invention.

For the related circuit of the falling-edge portion according to the preferred embodiment of the present invention, please refer to FIG. 10, which slows a circuit diagram illustrating a trigger circuit 49 (ring counter) of the falling-edge portion in accordance with another embodiment of the present invention. As shown in drawing, said trigger circuit 49 composed of a ring counter receives a clock signal which is to be counted and then generate a first falling flag signal FLAG F1 and a second falling flag signal FLAG F2. The preferred embodiment of the present invention as shown in FIG. 10 is exemplified by a 2×2 configuration, which comprises a fifth D-type flip-flop 52 and a sixth D-type flip-flop 54 serially connected, forming a ring counter with the output of said sixth D-type flip-flop 54 coupled back to the D input of said fifth D-type flip-flop 52; and a fourth D-type flip-flop 50 connected to the input of said ring counter (i.e. said fifth D-type flip-flop 52) so as to provide the said trigger circuit (ring counter) with required clock signals.

Figure 11A:
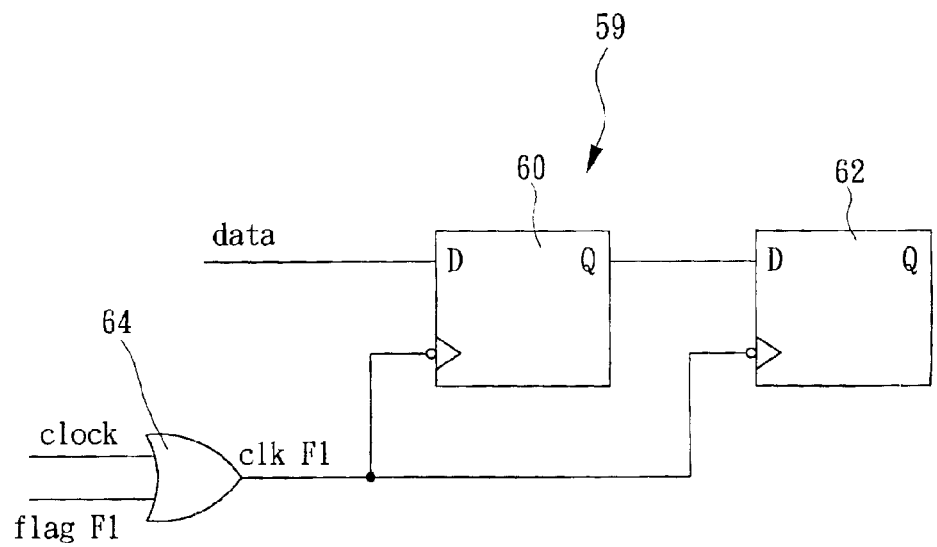
FIG. 11A illustrates a first falling-edge sampling circuit operative for generation of a first falling sampling clock signal in accordance with another embodiment of the present invention.
Figure 11B:
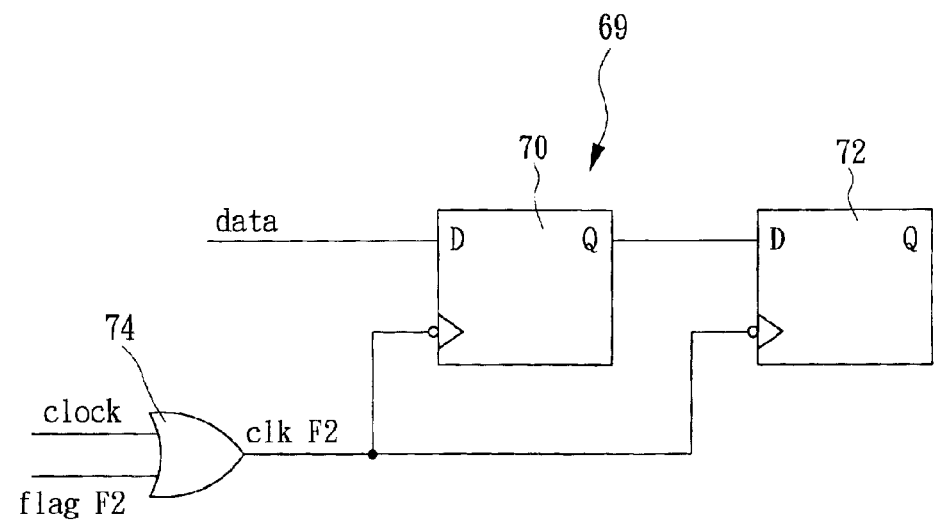
FIG. 11B illustrates a second falling-edge sampling circuit operative for generation of a second falling sampling clock signal in accordance with another embodiment of the present invention.

For the falling-edge sampling circuits 59 and 69, please refer to FIG. 11A and FIG. 11B. In particular, FIG. 11A illustrates a first falling-edge sampling circuit operative for generation of a first falling sampling clock signal CLK F1 in accordance with another embodiment of the present invention. Said falling-edge sampling circuit 59 is composed of two serially connected D-type flip-flops. The preferred embodiment of the present invention as shown in FIG. 11A is exemplified by a 2×2 configuration, which comprises a first D-type sampling flip-flop 60 and a second D-type sampling flip-flop 62 serially connected so as to store the sampled data. The number of D-type sampling flip-flops can be increased according to the user's need. Said first falling sampling clock signal CLK F1 generated by an OR operation of said clock signal and said first falling flag signal FLAG F1 provided by a first OR gate 64 is input into said serially connected D-type flip-flops for timing control during data sampling.

On the other hand, FIG. 11B illustrates a second falling-edge sampling circuit operative for generation of a second falling sampling clock signal CLK F2 in accordance with another embodiment of the present invention. Said rising-edge sampling circuit 69 is composed of two serially connected D-type flip-flops. The preferred embodiment of the present invention as shown in FIG. 7B is exemplified by a 2×2 configuration, which comprises a third D-type sampling flip-flop 70 and a fourth D-type sampling flip-flop 72 serially connected so as to store the sampled data. The number of D-type sampling flip-flops can be increased according to the user's need. Said second falling sampling clock signal CLK F2 generated by an OR operation of said clock signal and said second falling flag signal FLAG F2 provided by a second OR gate 74 is input into said serially connected D-type flip-flops for timing control during data sampling.

Figure 12:
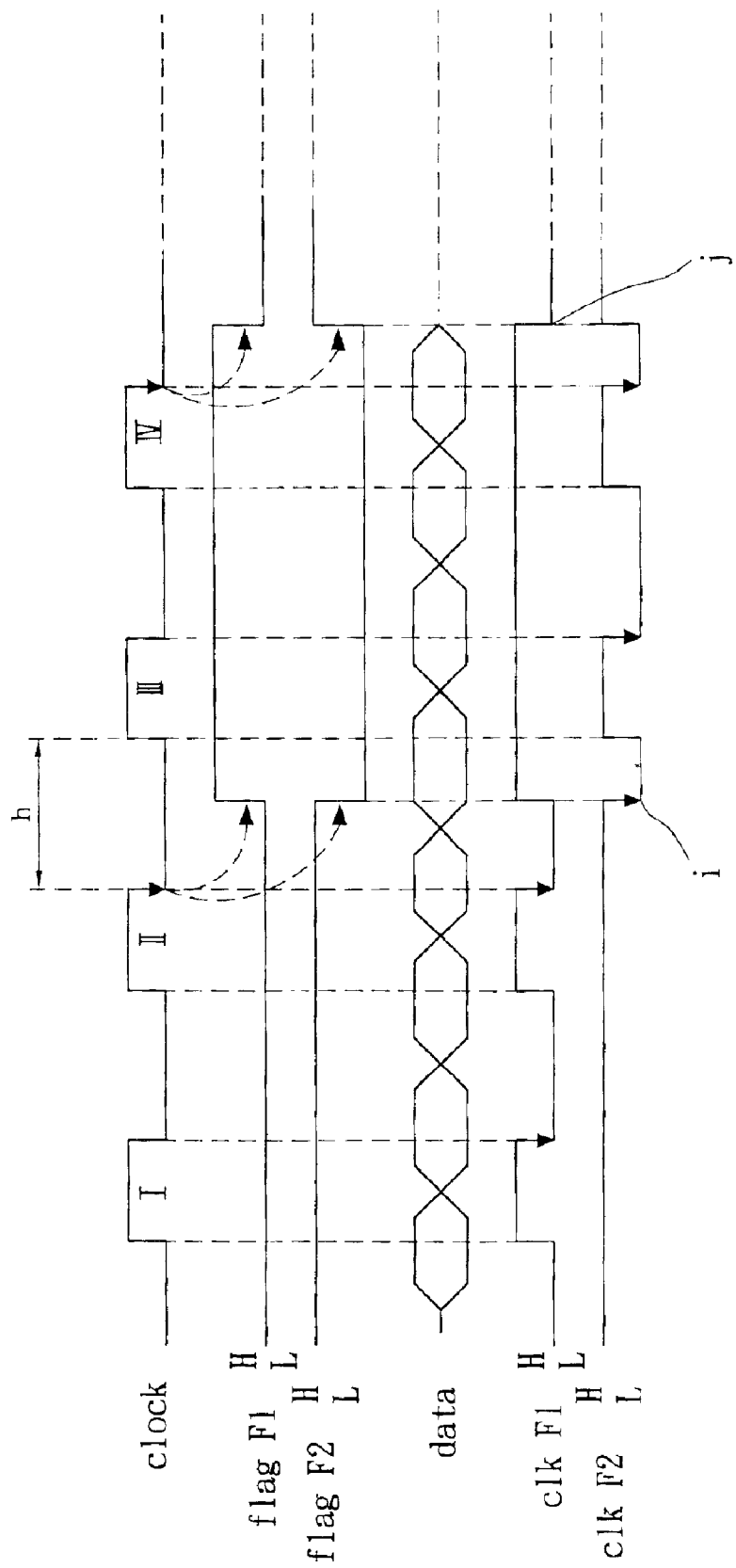
FIG. 12 shows a timing diagram of the falling-edge portion in accordance with another embodiment of the present invention, wherein the transitions of the flag signals are performed in a low-level region.

Please refer to FIG. 12, which shows a timing diagram of the falling-edge portion in accordance with another embodiment of the present invention, wherein the transitions of the flag signals are performed in a low-level region. In FIG. 12, the excess pulse edge (labeled as "i") occurs when the data transfer is performed in a low-level region and when the sampling is performed in the falling transition. For example, when the transitions of said first falling flag signal FLAG F1 and said second falling flag signal FLAG F2 are performed in the region "h" where clock II is low, the sampled data in the falling transition may be an error, but can be over-written with the correct data j sampled afterwards.

Figure 13:
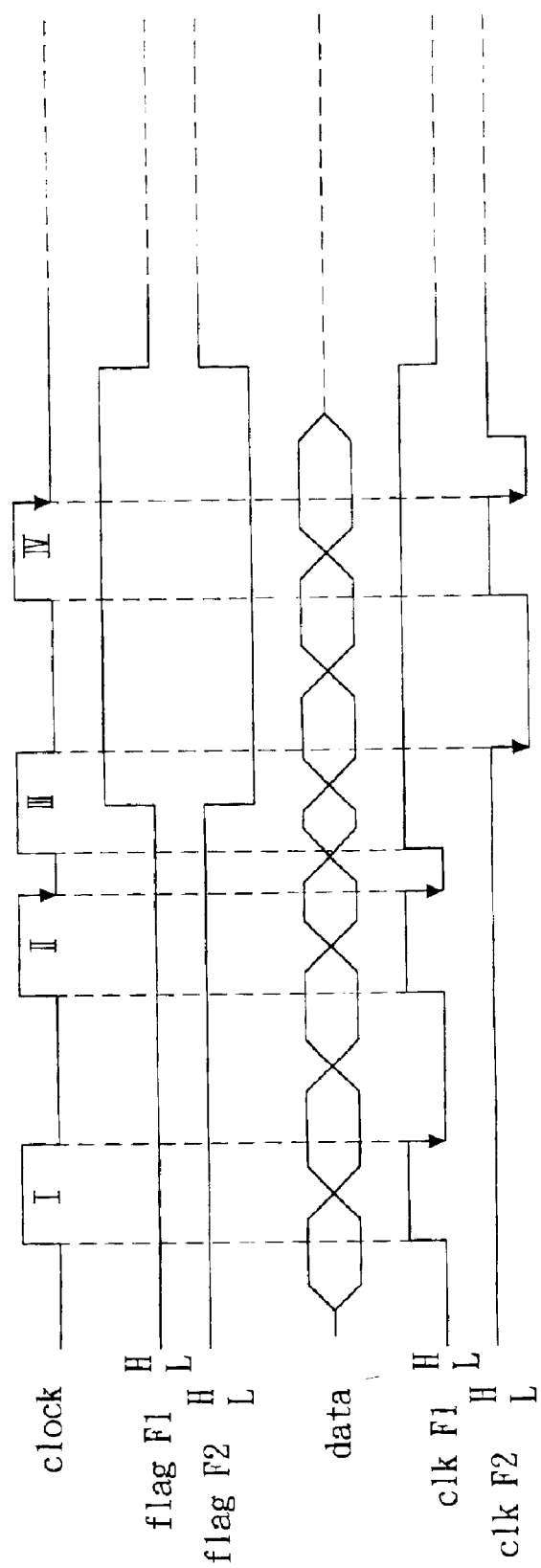
FIG. 13 shows a timing diagram of the falling-edge portion in accordance with another embodiment of the present invention, wherein the transitions of the flag signals are performed in a high-level region.

Similarly, FIG. 13 shows a timing diagram of the falling-edge portion in accordance with one embodiment of the present invention, wherein the transitions of the flag signals are performed in a high-level region. This case occurs in a normal condition in which the transitions of said first failing flag signal FLAG F1 and said second falling flag signal FLAG F2 are performed in the region "d" where clock II is low, therefore the sampled data are correct.

On the other hand, the present invention can also be applicable to the case in which the data are stored into the buffer during the falling transition of the sampling clock signal. For the implementation of this case, only the falling-edge device of the embodiment of the present invention is necessary. However, the rising-edge device of the embodiment of the present invention can also be used for the same purpose. In order the distinguish the present invention from the prior arts, one embodiment of the falling-edge device is exemplarily described. As shown in FIG. 10 and FIGS. 11A and 11B, the circuit comprises a trigger circuit, implemented by using a ring counter and triggered by the falling-edge sampling signals so as to generate the falling-edge flag signals FLAG F1 and FLAG F2 form a ring counter by using a plurality of flip-flops.

Meanwhile, as shown in FIGS. 11A and 11B, there are provided a plurality of falling-edge circuits, implemented by using a plurality of serially connected flip-flops, wherein the clock input signal of said plurality of serially connected flip-flops is generated by an OR operation of said clock signal and said falling flag signal provided by an OR gate.

In the falling-edge circuits, an excess pulse edge occurs when the data transfer is performed in a low-level region. Even though the sampled data by the excess pulse edge may be incorrect, it can be over-written with the correct data sampled afterwards such that the error data can be prevented and the correct data can be ensured. Moreover, the embodiment of the falling-edge sampling circuit can be implemented by using D-type flip-flops so as to form a ring counter and a sampling clock generation circuit.

Hereinafter, the high-speed data transfer/storage technique of the present invention is compared to the prior art in three aspects:

1. In the prior art, the transitions of the flag signals is limited in a low-level region, which only lasts half a clock cycle. On the contrary, in the present invention, the timing margin can be prolonged from half a clock cycle to a full clock cycle. However, due to the switching of the flag signals, an excess rising/falling edge may occur and cause an error when the data are input into the buffer. In the present invention, sampling clock for rising-edge sampling generated by an AND gate or sampling clock for falling-edge sampling generated by an OR gate is used so that the excess pulse edge can be ensured to occur before the correct edge and the error data caused by the excess pulse can be over-written with the correct data input afterwards. Therefore, a clock cycle of timing margin can be obtained and the data stored in the data buffer can be ensured to be correct.
2. In accordance with the preferred embodiment of the present invention, both the rising edge and the falling edge of the clock signal are adopted by the data buffer. However, when only the rising edge or the falling edge of the clock signal is needed, only the rising-edge device or the falling-edge device needs to be used.
3. The high-speed data buffer of the present invention can be applicable to not only high-speed data communication systems but also all kinds of high-speed system in which data buffers are necessary.

As discussed so far, in accordance with the present invention, there is provided a high-speed data buffer, wherein an excess pulse edge occurs and the sampled data may be incorrect but can be over-written with the correct data sampled afterwards, so as to ensure the sampled data being correct. Consequently, the present invention is progressive and has great potential in commercial applications.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A high-speed data buffer, comprising:
   a rising-edge device having a trigger circuit and a plurality of rising edge circuits; and
   a falling-edge device having a trigger circuit and a plurality of falling edge circuits;
   wherein said buffer extends a timing margin thereof for sampling correct data; and
   wherein said trigger circuit of said rising-edge device comprises a ring counter for receiving a clock signal and counting in response to said clock signal so as to generate a first rising flag signal FLAG R1 and a second rising flag signal FLAG R2.
2. The high-speed data buffer as recited in claim 1, wherein each rising-edge circuit of said rising-edge device comprises a plurality of flip-flops serially connected to store sampled data, wherein said plurality of flip-flops receive a first rising sampling clock signal CLK R1 generated by an AND operation, provided by a first AND gate, of said clock signal and said first rising flag signal FLAG R1 and a second rising sampling clock signal CLK R2 generated by an AND operation, provided by a second AND gate, of said clock signal and said second rising flag signal FLAG R2.
3. The high-speed data buffer as recited in claim 1, wherein said ring counter comprises a plurality of D-type flip-flops.
4. The high-speed data buffer as recited in claim 2, wherein said flip-flops of said rising-edge circuit are D-type flip-flops.
5. The high-speed data buffer as recited in claim 1, further comprising a D-type flip-flop to provide said ring counter with said clock signal.
6. A high-speed data buffer, comprising:
   a rising-edge device having a trigger circuit and a plurality of rising edge circuits; and
   a falling-edge device having a trigger circuit and a plurality of falling edge circuits;
   wherein said buffer extends a timing margin thereof for sampling correct data; and
   wherein said trigger circuit of said falling-edge device comprises a ring counter receiving a clock signal and counting in response to said clock signal, so as to generate a first falling flag signal FLAG F1 and a second falling flag signal FLAG F2.
7. The high-speed data buffer as recited in claim 6, wherein each falling-edge circuit of said falling-edge device comprises a plurality of flip-flops serially connected to store sampled data, wherein said plurality of flip-flops receive a first falling sampling clock signal CLK F1 generated by an OR operation, provided by a first OR gate, of said clock signal and said first falling flag signal FLAG F1 and a second falling sampling clock signal CLK F2 generated by an OR operation, provided by a second OR gate, of said clock signal and said second falling flag signal FLAG F2.
8. The high-speed data buffer as recited in claim 6, wherein said ring counter comprises a plurality of D-type flip-flops.
9. The high-speed data buffer as recited in claim 7, wherein said flip-flops of said falling-edge circuit are D-type flip-flops.
10. A high-speed data buffer, comprising:
    a rising-edge device and a falling-edge device, wherein said rising-edge device comprises:
    a ring counter, operative for generating a rising flag signal for data sampling; and
    a rising-edge circuit, comprising a plurality of flip-flops serially connected, wherein said plurality of flip-flops are clocked by an AND operation output, provided by an AND gate, of said clock signal and said rising flag signal;
    said falling-edge device comprises:
    a ring counter, operative for generating a falling flag signal for data sampling; and
    a falling-edge circuit, comprising a plurality of flip-flops serially connected, wherein said plurality of flip-flops are clocked by an OR operation output, provided by an OR gate, of said clock signal and said falling flag signal.
11. The high-speed data buffer as recited in claim 10, wherein said ring counters comprise a plurality of D-type flip-flops.

12. The high-speed data buffer as recited in claim 10, wherein said flip-flops are D-type flip-flops.

13. A high-speed data buffer, comprising:

a ring counter, operative for generating a falling flag signal for data sampling; and a falling-edge circuit, clocked by an OR operation output, provided by an OR gate, of said clock signal and said falling flag signal;

wherein, while an excess pulse edge occurs when the data transfer is performed in a low-level region, data sampled by the excess pulse edge is incorrect, said falling-edge circuit overwriting said incorrect sampled data with subsequent correct data so as to ensure sampling correct data.

14. The high-speed data buffer as recited in claim 13, wherein said ring counter comprises a plurality of D-type flip-flops.

15. The high-speed data buffer as recited in claim 13, wherein said plurality of falling-edge circuits comprises a plurality of D-type flip-flops serially connected.

16. The high-speed data buffer as recited in claim 13, wherein said falling-edge circuit comprises a plurality of flip-flops serially connected.

* * * * *